US008956584B2

(12) United States Patent
Gupta et al.

(10) Patent No.: US 8,956,584 B2
(45) Date of Patent: Feb. 17, 2015

(54) PRODUCTION OF POLYCRYSTALLINE SILICON IN SUBSTANTIALLY CLOSED-LOOP PROCESSES THAT INVOLVE DISPROPORTIONATION OPERATIONS

(75) Inventors: Puneet Gupta, Houston, TX (US); Yue Huang, Modlothian, VA (US); Satish Bhusarapu, Houston, TX (US)

(73) Assignee: SunEdison, Inc., St. Peters, MO (US)

( * ) Notice: Subject to any disclaimer, the term of this patent is extended or adjusted under 35 U.S.C. 154(b) by 578 days.

(21) Appl. No.: 13/328,029

(22) Filed: Dec. 16, 2011

(65) Prior Publication Data

US 2012/0189527 A1  Jul. 26, 2012

Related U.S. Application Data

(60) Provisional application No. 61/425,069, filed on Dec. 20, 2010.

(51) Int. Cl.
*C01B 33/03* (2006.01)
*B01J 8/24* (2006.01)
*C01B 33/04* (2006.01)

(52) U.S. Cl.
CPC ...................... *C01B 33/03* (2013.01)
USPC ........... 423/349; 423/342; 423/344; 423/347; 423/348; 422/139; 422/187; 422/630; 556/469; 556/472

(58) Field of Classification Search
CPC .... C01B 33/029; C01B 33/03; C01B 33/033; C01B 33/043; C01B 33/107; C01B 33/10773; B01J 8/18; B01J 8/24
USPC .......... 423/342, 347–349; 422/139, 187, 600, 422/630; 556/469, 452, 465, 466, 472, 473, 556/476, 477; 427/213
See application file for complete search history.

(56) References Cited

U.S. PATENT DOCUMENTS

| | | | |
|---|---|---|---|
| 3,565,590 A | | 2/1971 | Bracken |
| 4,092,446 A | * | 5/1978 | Padovani et al. ............... 427/213 |
| 4,117,094 A | | 9/1978 | Blocher, Jr. et al. |
| 4,318,942 A | | 3/1982 | Woerner et al. |
| 4,340,574 A | | 7/1982 | Coleman |
| 4,444,811 A | | 4/1984 | Hsu et al. |
| 4,601,798 A | | 7/1986 | Jacubert et al. |
| 4,632,816 A | | 12/1986 | Marlett |
| 4,676,967 A | | 6/1987 | Breneman |
| 4,784,840 A | | 11/1988 | Gautreaux et al. |
| 4,818,495 A | | 4/1989 | Iya |

(Continued)

FOREIGN PATENT DOCUMENTS

EP  2179965 A1  4/2010

OTHER PUBLICATIONS

Co-owned U.S. Appl. No. 13/328,030, filed Dec. 16, 2011.

(Continued)

*Primary Examiner* — Colleen Dunn
*Assistant Examiner* — Kallambella Vijayakumar
(74) *Attorney, Agent, or Firm* — Armstrong Teasdale LLP

(57) ABSTRACT

Production of polycrystalline silicon in substantially closed-loop processes and systems is disclosed. The processes and systems generally involve disproportionation of trichlorosilane to produce silane or dichlorosilane and thermal decomposition of silane or dichlorosilane to produce polycrystalline silicon.

12 Claims, 3 Drawing Sheets

(56) References Cited

U.S. PATENT DOCUMENTS

| | | |
|---|---|---|
| 4,868,013 A | 9/1989 | Allen |
| 5,871,705 A | 2/1999 | Sakata et al. |
| 5,910,295 A * | 6/1999 | DeLuca .................. 423/337 |
| 6,932,954 B2 | 8/2005 | Wakamatsu et al. |
| 6,942,844 B2 | 9/2005 | Muller et al. |
| 2002/0044904 A1 | 4/2002 | Bulan et al. |
| 2004/0022713 A1 | 2/2004 | Bulan et al. |
| 2004/0028593 A1 | 2/2004 | Bulan et al. |
| 2004/0028594 A1 | 2/2004 | Klein et al. |
| 2004/0030171 A1 | 2/2004 | Klein et al. |
| 2004/0047793 A1 | 3/2004 | Mleczko et al. |
| 2004/0047797 A1 | 3/2004 | Block et al. |
| 2004/0062702 A1 | 4/2004 | Block et al. |
| 2004/0091412 A1 | 5/2004 | Muller et al. |
| 2004/0101463 A1 | 5/2004 | Bulan et al. |
| 2004/0151652 A1 | 8/2004 | Herold et al. |
| 2005/0074387 A1 | 4/2005 | Bulan et al. |
| 2009/0060820 A1 | 3/2009 | Shimizu et al. |
| 2009/0098039 A1 | 4/2009 | Wakamatsu et al. |
| 2009/0324479 A1 | 12/2009 | Kulkarni et al. |
| 2009/0324819 A1 | 12/2009 | Kulkarni et al. |
| 2010/0061913 A1 * | 3/2010 | Hariharan et al. ............ 423/342 |
| 2011/0000257 A1 * | 1/2011 | Gadre et al. .................. 62/617 |
| 2011/0158857 A1 | 6/2011 | Erk |
| 2011/0158888 A1 | 6/2011 | Erk |
| 2012/0189501 A1 | 7/2012 | Gupta et al. |

OTHER PUBLICATIONS

Dirk Muller, et al., Development and Economic Evaluation of a Reactive Distillation Process for Silane Production, Distillation and Adsorption: Integrated Processes, Bayer AG, D-51368 Leverkuse (2002), 11 pages.

A. Briglio, Jr., An Analysis of the Feasibility of Producing Silicon for Solar Cells by a Dichlorosilane/Fluidized-Bed Reactor Process, Technical Report, National Aeronautics and Space Administration, May 1984, 21 pages.

PCT International Search Report and Written Opinion of the International Searching Authority mailed on Feb. 2, 2012 regarding PCT/US2011/065399; 8 pages.

Non-Final Office Action, U.S. Appl. No. 13/328,030, dated Sep. 6, 2013, pp. 9.

* cited by examiner

US 8,956,584 B2

PRODUCTION OF POLYCRYSTALLINE SILICON IN SUBSTANTIALLY CLOSED-LOOP PROCESSES THAT INVOLVE DISPROPORTIONATION OPERATIONS

CROSS-REFERENCE TO RELATED APPLICATIONS

This application claims the benefit of U.S. Provisional Application No. 61/425,069, filed Dec. 20, 2010, which is incorporated herein by reference.

FIELD OF THE DISCLOSURE

The field of the present disclosure relates to production of polycrystalline silicon in substantially closed-loop processes and, particularly, processes that involve disproportionation of trichlorosilane produced from metallurgical grade silicon.

BACKGROUND

Polycrystalline silicon is a vital raw material used to produce many commercial products including, for example, integrated circuits and photovoltaic (i.e., solar) cells. Polycrystalline silicon is often produced by a chemical vapor deposition mechanism in which silicon is deposited from a thermally decomposable silicon compound onto silicon particles in a fluidized bed reactor or onto silicon rods as in a Siemens-type reactor. The seed particles continuously grow in size until they exit the reactor as polycrystalline silicon product (i.e., "granular" polycrystalline silicon). Suitable decomposable silicon compounds include, for example, silane and halosilanes such as trichlorosilane.

Silane may be produced by reacting silicon tetrafluoride with an alkali or alkaline earth metal aluminum hydride such as sodium aluminum tetrahydride as disclosed in U.S. Pat. No. 4,632,816, which is incorporated herein by reference for all relevant and consistent purposes. Silane may alternatively be produced by the so-called "Union Carbide Process" in which metallurgical-grade silicon is reacted with hydrogen and silicon tetrachloride to produce trichlorosilane as described by Muller et al. in "Development and Economic Evaluation of a Reactive Distillation Process for Silane Production," *Distillation and Adsorption: Integrated Processes*, 2002, which is incorporated herein by reference for all relevant and consistent purposes. The trichlorosilane is subsequently taken through a series of disproportionation and distillation steps to produce a silane end-product. The starting compounds of silane production are relatively expensive components in silane-based production of polycrystalline silicon.

A continuing need exists for processes for producing polycrystalline silicon that reduce the amount of hydrogen and chlorine used relative to conventional methods and for methods that are capable of producing polycrystalline silicon in a substantially closed-loop process relative to hydrogen or chlorine (e.g., hydrogen chloride). A continuing need also exists for systems for producing polycrystalline silicon that make use of such processes.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a substantially closed-loop process for producing polycrystalline silicon. Trichlorosilane is introduced into a disproportionation system to produce silicon tetrachloride and at least one of silane and dichlorosilane. Silane or dichlorosilane produced from the disproportionation system is introduced into a fluidized bed reactor to produce polycrystalline silicon and an effluent gas containing hydrogen and unreacted silane or dichlorosilane. An amount of silicon tetrachloride produced from the disproportionation system and an amount of hydrogen from the effluent gas are introduced into a hydrogenation reactor to produce trichlorosilane and hydrogen chloride. An amount of hydrogen chloride produced from the hydrogenation reactor and silicon are introduced into a chlorination reactor to produce a chlorinated gas containing trichlorosilane and silicon tetrachloride. Trichlorosilane produced from the chlorination reactor is introduced into the disproportionation system to produce silicon tetrachloride and at least one of silane and dichlorosilane.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

In accordance with the present disclosure, substantially closed-loop processes and systems for producing polycrystalline silicon from silane are provided. As used herein, the phrases "substantially closed-loop process" or "substantially closed-loop system" refer to a process or system in which the compound with respect to which the system or process is substantially closed-loop is not withdrawn from the system or process other than as an impurity and is not fed into the system or process other than as in a make-up stream. As used herein, the systems and processes are substantially closed-loop with respect to all compounds other than silicon such as, for example, trichlorosilane, silicon tetrachloride, silane, hydrogen chloride and/or hydrogen gas.

Closed-Loop Processes for Producing Polycrystalline Silicon

Figure 1:
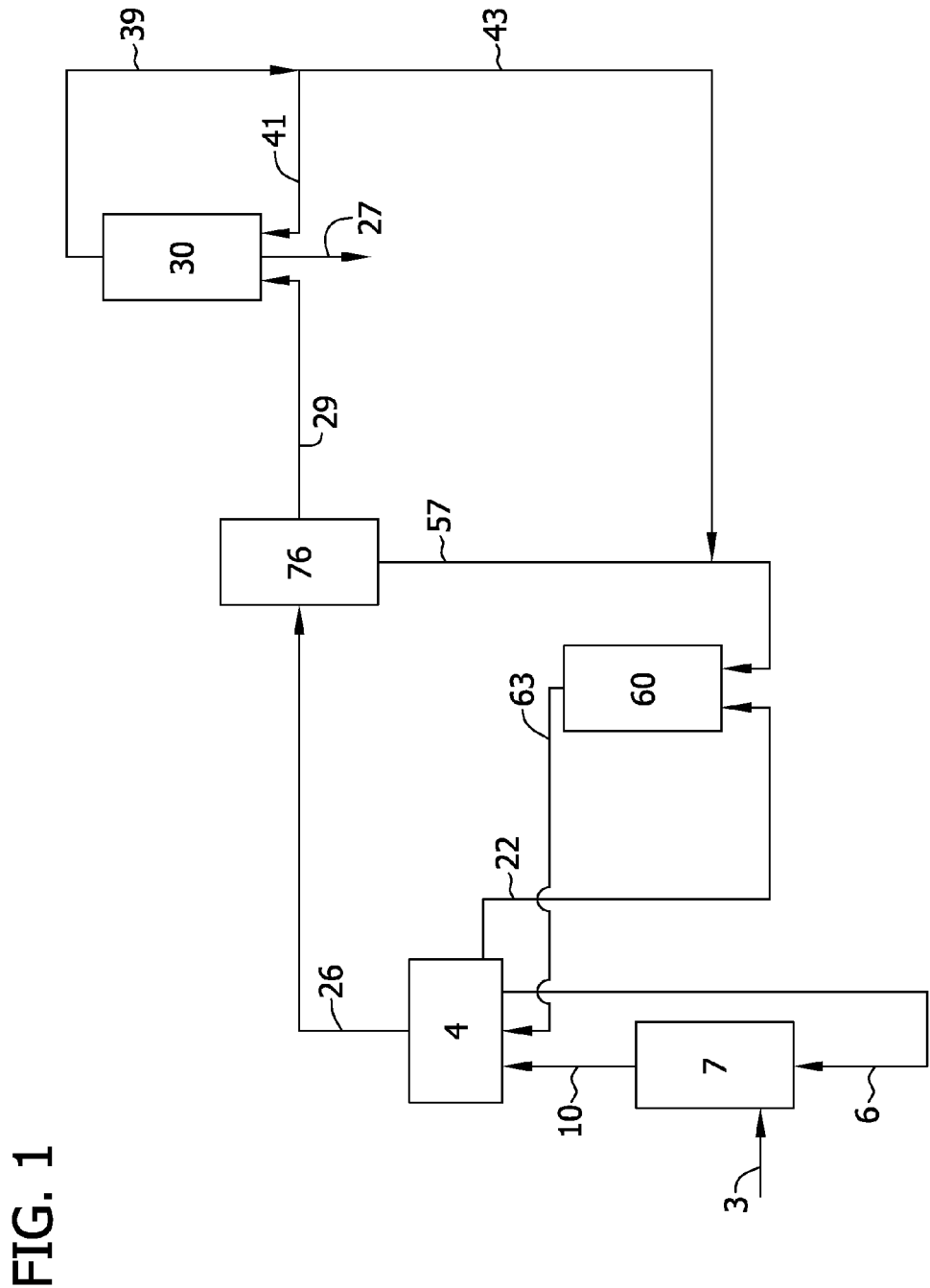
FIG. 1 is a flow diagram of a system for producing polycrystalline silicon by the thermal decomposition of silane or dichlorosilane.

In several embodiments of the present disclosure and as shown in FIG. 1, a source of silicon 3 and hydrogen chloride 6 are introduced and contacted in a chlorination reactor 7 to produce a chlorinated gas 10. The chlorinated gas 10 contains trichlorosilane and silicon tetrachloride as well as hydrogen and unreacted hydrogen chloride. Trichlorosilane and silicon tetrachloride may be produced in the chlorination reactor 7 according to the following reactions,

$$Si + 3HCl \rightarrow SiHCl_3 + H_2 \quad (1),$$

$$SiHCl_3 + HCl \rightarrow SiCl_4 + H_2 \quad (2).$$

In this regard it should be understood that, as used herein, "contact" of two or more reactive compounds generally results in a reaction of the components and the terms "contacting" and "reacting" are synonymous as are derivations of these terms and these terms and their derivations should not be considered in a limiting sense. Typically the source of silicon 3 is metallurgical grade silicon; however, it should be understood that other sources of silicon may be used such as, for example, sand (i.e., $SiO_2$), quartz, flint, diatomite, mineral silicates, fused silica, fluorosilicates and mixtures thereof. The particle size of the silicon may range from about 10 μm to about 750 μm or from about 50 μm to about 250 μm prior to introduction into the reactor 7. Increasing the particle size generally decreases the reaction rate while smaller sizes result in more particles being entrained in spent reactor gases and difficulty in fluidization as a result of increased cohesive forces among the smaller diameter particles.

The chlorination reactor 7 may be a fluidized bed reactor in which silicon 3 is suspended in the incoming hydrogen chloride gas 6. The reactor 7 may be operated at a temperature of at least about 250° C. and, in other embodiments, at least about 300° C. (e.g., from about 250° C. to about 450° C. or from about 300° C. to about 400° C.). In view of the exothermic nature of reactions (1) and (2), the chlorination reactor 7 may include cooling means (e.g., cooling coils in thermal communication with the reactor bed or a cooling jacket) to assist in controlling the temperature of the reactor. In this regard, it should be understood that while the chlorination reactor 7 may be a fluidized bed reactor, other reactor designs may be used without limitation.

The reactor 7 may be operated at a pressure (i.e., overhead gas pressure) of at least about 1 bar such as, for example, from about 1 bar to about 10 bar, from about 1 bar to about 7 bar or from about 2 bar to about 5 bar. The incoming hydrogen chloride stream 6 may include an amount of impurities such as chlorosilanes (e.g., silicon tetrachloride and/or trichlorosilane). In various embodiments of the present disclosure, the hydrogen chloride stream 6 comprises at least about 80 vol % hydrogen chloride, at least about 90 vol %, at least about 95 vol % or even at least about 99 vol % hydrogen chloride (e.g., from about 80 vol % to about 99 vol % or from about 90 vol % to about 99 vol %).

The chlorination reactor 7 may include an amount of catalyst to promote formation of trichlorosilane relative to formation of silicon tetrachloride in the chlorinated gas 10. For instance, the chlorination reactor 7 may include a group VIII metal catalyst (e.g., iron, cobalt, nickel, vanadium and/or platinum) or a catalyst containing aluminum, copper or titanium metal as disclosed in U.S. Pat. No. 5,871,705, which is incorporated herein by reference for all relevant and consistent purposes. The reactor 7 may also include an amount of one or more alkali metal compounds (e.g., lithium chloride, sodium chloride, potassium chloride, cesium chloride, rubidium chloride, sodium sulfate and/or sodium nitrate) to increase the selectivity toward trichlorosilane. The reactor 7 may be operated at from about 1.1 times to about 8 times the minimum fluidization velocity or from about 1.5 to about 4 times the minimum fluidization velocity.

The conversion of hydrogen chloride in the chlorination reactor 7 may vary depending on the reaction conditions and, typically, will be at least about 50%, at least about 65%, at least about 80%, at least about 90% and in some embodiments, conversion may approach 100% (e.g., from about 50% to about 100% or from about 80% to about 100%). Selectivity toward trichlorosilane may be at least about 50%, at least about 65% or even at least about 80% (e.g., from about 50% to about 90% or from about 70% to about 90%).

The chlorinated gas 10 is introduced into a separation system 4 to separate trichlorosilane and silicon tetrachloride (designated collectively as 26) from hydrogen 22 and hydrogen chloride 6. Unreacted hydrogen chloride 6 is recycled for use in the chlorination reactor 7. Hydrogen 22 is sent forward to a hydrogenation reactor 60 discussed further below. The trichlorosilane and silicon tetrachloride 26 are introduced into a disproportionation system 76 in which silicon tetrachloride 57 is separated out and silane 29 is produced. Optionally, the trichlorosilane and silicon tetrachloride 26 may be introduced into a separator (not shown) such as a stripper column to separate one or more impurities from the gases and, for example, to separate light-end impurities (i.e., compounds with a boiling point less than silane) prior to introduction into the disproportionation system. Such stripper columns may be operated at a pressure of at least about 3 bar (e.g., from about 3 bar to about 10 bar).

Figure 3:
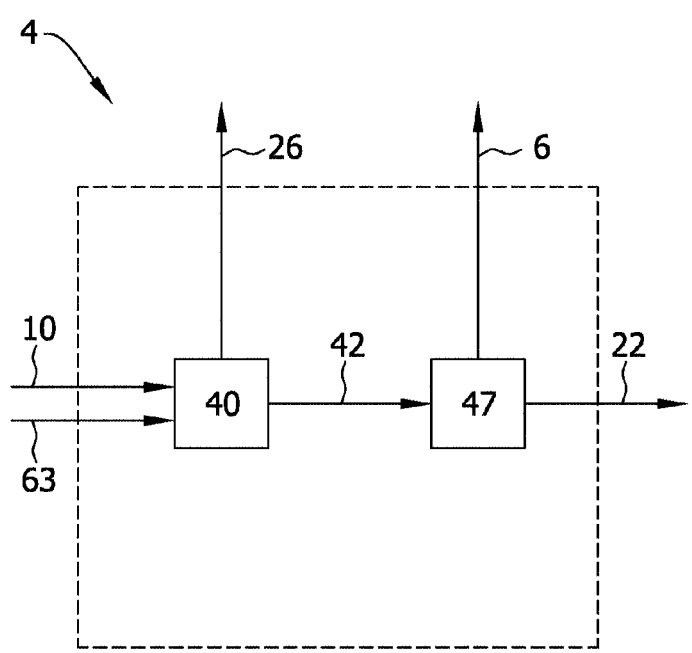
FIG. 3 is a flow diagram of a separation system for separating chlorosilanes, hydrogen and hydrogen chloride.

An exemplary separation system 4 for use in the processes of the present disclosure is shown in FIG. 3. The separation system 4 includes a chlorosilane separator 40 to separate trichlorosilane and silicon tetrachloride 26 from hydrogen and hydrogen chloride 42. The chlorosilane separator 40 may be constructed according to any of the methods for separating gaseous components as appreciated by those of skill in the art. In some embodiments, the separator 40 is a vapor-liquid separator. Examples of such vapor-liquid separators include vessels in which the pressure and/or temperature of the incoming gas (e.g., chlorinated gas 10 and hydrogenated gas 63 described below) is reduced causing the higher boiling-point gases (e.g., silicon tetrachloride and trichlorosilane) to condense and separate from lower boiling point gases (e.g., hydrogen and hydrogen chloride). Suitable vessels include vessels which are commonly referred to in the art as "knock-out drums." Optionally, the vessel may be cooled to promote separation of gases. Alternatively, the separator 40 may be one or more distillation columns.

Hydrogen and hydrogen chloride 42 are introduced into a hydrogen separator 47 to produce a hydrogen chloride gas 6 that is introduced into the chlorination reactor 7 and a hydrogen gas 22 that is introduced into a hydrogenation reactor 60. The hydrogen separator 47 may be any type of separator suitable to separate hydrogen from hydrogen chloride. An exemplary separator 47 is a bubbler in which hydrogen and hydrogen chloride are bubbled through a vessel containing a fluid (e.g., water) and, typically, in which the fluid is continuously introduced (not shown) and removed. Hydrogen chloride is adsorbed within the fluid (e.g., water) while separated hydrogen is removed from the vessel as a gas. Alternatively, the hydrogen separator 47 may be a vapor-liquid separator (e.g., knock-out drum) and the hydrogen and hydrogen chloride 42 may be partially condensed prior to introduction into the separator 47. In alternative embodiments, the hydrogen separator 47 includes use of one or more distillation columns to separate hydrogen 22 from hydrogen chloride 6. In this regard, it should be understood that methods and apparatus for separating and purifying hydrogen and hydrogen chloride other than those recited above may be used in any combination (e.g., in series or in parallel) without departing from the scope of the present disclosure.

Figure 2:
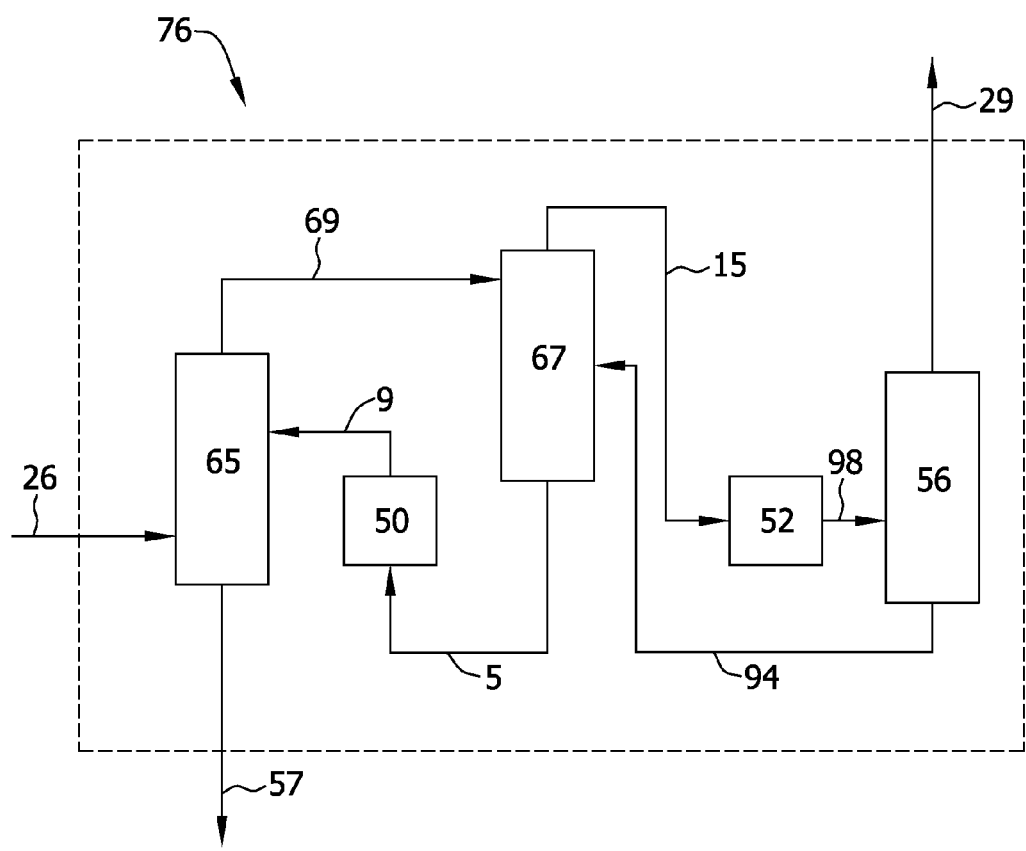
FIG. 2 is a flow diagram of a disproportionation system for converting trichlorosilane to silane.

The disproportionation system 76 to which silicon tetrachloride and trichlorosilane are introduced from the separation system may include any unit operations customary in disproportionation operations as appreciated by those of skill in the art, and particularly, equipment suitable for conversion of trichlorosilane to silane such as disclosed in U.S. Pat. No. 4,676,967 which is incorporated herein by reference for all relevant and consistent purposes. An exemplary disproportionation system 76 for producing silane 29 is shown in FIG. 2. The disproportionation system 76 includes a first distillation column 65, a second distillation column 67, a third distillation column 56, a first disproportionation reactor 50 and a second disproportionation reactor 52. Silicon tetrachloride and trichlorosilane 26 are introduced into the first distillation column 65 to separate silicon tetrachloride into a bottoms fraction 57 and to separate trichlorosilane into an overhead fraction 69. Dichlorosilane and silicon tetrachloride 9 produced from the first disproportionation reactor 50 described below is also introduced into the first distillation column 65 to separate dichlorosilane into the overhead fraction 69 and silicon tetrachloride into the bottoms fraction 57. The first distillation column 65 may be operated at a pressure of at least about 2 bar (e.g., from about 2 bar to about 5 bar) and at an overhead temperature of at least about −25° C., at least about 25° C. or at least about 75° C. (e.g., from about −25° C. to about 150° C. or from about 0° C. to about 75° C.).

The trichlorosilane-containing overhead fraction 69 produced from the first distillation column 65 is introduced into the second distillation column 67 to separate trichlorosilane into a bottoms fraction 5 and dichlorosilane into an overhead fraction 15. The second distillation column 67 may be operated at a pressure of at least about 10 bar (e.g., from about 10 bar to about 35 bar or from about 20 bar to about 25 bar) and at an overhead temperature of at least about −75° C., at least about −50° C. or at least about −25° C. (e.g., from about −75° C. to about 100° C. or from about −50° C. to about 50° C.).

The trichlorosilane-containing bottoms fraction 5 produced from the second distillation column 67 is introduced into the first disproportionation reactor 50 to produce a first disproportionation reactor product gas 9 that contains dichlorosilane and silicon tetrachloride according to the following reaction, $$2SiHCl_3 \rightarrow SiH_2Cl_2 + SiCl_4 \qquad (3).$$

The reactor 50 may include one or more catalysts therein to promote reaction (3) including, for example, polymeric resins (e.g., AMBERLYST A21).

The first disproportionation reactor product gas 9 is introduced into the first distillation column 65. The dichlorosilane-containing overhead fraction 15 produced from the second distillation column 67 is introduced into the second disproportionation reactor 52 to produce a second disproportionation reactor product gas 98 containing trichlorosilane and silane according to the reactions shown below, $$2SiH_2Cl_2 \rightarrow SiH_3Cl + SiHCl_3 \qquad (4),$$

$$2SiH_3Cl \rightarrow SiH_2Cl_2 + SiH_4 \qquad (5).$$

The net conversion to silane and trichlorosilane (i.e., the sum of reactions (4) and (5)) is shown by the following reaction, $$3SiH_2Cl_2 \rightarrow 2SiHCl_3 + SiH_4 \qquad (6).$$

In this regard it should be understood that reactions (3)-(6) do not represent the entire set of reactions that may occur in the disproportionation system 76 and other reactions may occur resulting in production of other intermediates and by-products within the system 76 including, for example, monochlorosilane, trichlorosilane and/or silane. The reactor 52 may include one or more catalysts therein to promote the reaction including, for example, polymeric resins (e.g., AMBERLYST A21).

The second disproportionation reactor product gas 98 is introduced into the third distillation column 56 to separate silane into an overhead fraction 29 and trichlorosilane into a bottoms fraction 94. The third distillation column 56 may be operated at a pressure of at least about 10 bar (e.g., from about 10 bar to about 35 bar or from about 20 bar to about 25 bar) and at an overhead temperature of at least about −75° C., at least about −50° C. or at least about −25° C. (e.g., from about −75° C. to about 100° C. or from about −50° C. to about 50° C.). Silane 29 is vaporized and introduced into the fluidized bed reactor 30 (FIG. 1) for production of polycrystalline silicon 27. The trichlorosilane-containing bottoms fraction 94 is introduced into the second distillation column 67. In this regard, it should by understood that systems and processes for producing silane other than as shown in FIG. 2 may be used without limitation including systems and processes wherein the reactors and/or columns shown therein are rearranged, added or eliminated.

It should be understood that while the substantially closed-loop processes and systems described herein are generally described with reference to production and thermal decomposition of silane, the disproportionation system 76 may be modified to produce dichlorosilane rather than silane. For example, the system 76 shown in FIG. 2 may operate without a second disproportionation reactor and third distillation column 56. The dichlorosilane containing overhead fraction 15 produced from the second distillation column 67 may be vaporized and introduced into the fluidized bed reactor 30 (FIG. 1) for production of polycrystalline silicon 27. The fluidized bed reactor 30 to which dichlorosilane is introduced may generally be operated in accordance with the silane-based fluidized bed reactor 30 described below. In this respect, dichlorosilane may decompose to form hydrogen and/or hydrogen chloride by-product and any hydrogen may be separated and introduced into the hydrogenation reactor 60 and any separated hydrogen chloride may be introduced into the chlorination reactor 7.

Referring again to FIG. 1, silicon tetrachloride 57 separated in the disproportionation system 76 is introduced into the hydrogenation reactor 60 to produce a hydrogenated gas 63 that includes trichlorosilane, hydrogen chloride, unreacted hydrogen and unreacted silicon tetrachloride. The hydrogenated gas 63 is introduced into the separation system 4 to separate the components thereof. Silicon tetrachloride 57 that is removed from the disproportionation system 60 is reacted with hydrogen 22 to produce trichlorosilane according to the following reaction, $$SiCl_4 + H_2 \rightarrow SiHCl_3 + HCl \qquad (7).$$

The hydrogenation reactor 60 may be a bubbler in which hydrogen 22 is bubbled through liquid silicon tetrachloride 57 to form trichlorosilane. Alternatively, silicon tetrachloride 57 is vaporized and the hydrogen 22 and silicon tetrachloride 57 are heated and reacted in a pressurized reaction vessel. In this regard, any vessel suitable for the hydrogenation reaction as appreciated by those of skill in the art may be used without limitation. The contents of the reaction vessel may be heated to a temperature of at least about 800° C. to convert silicon tetrachloride to trichlorosilane. In some embodiments, silicon tetrachloride 57 and hydrogen 22 are heated to a temperature of at least about 900° C., at least about 1000° C. or even at least about 1100° C. (e.g., from about 800° C. to about 1500° C., from about 800° C. to about 1200° C. or from about 1000° C. to about 1200° C.). The reaction vessel may also be pressurized to promote formation of trichlorosilane. For instance, the hydrogenation reactor 60 may be operated at a pressure of at least about 2 bar and, in other embodiments, at least about 5 bar, at least about 10 bar or even at least about 15 bar (e.g., from about 2 bar to about 20 bar or from about 8 bar to about 15 bar). The ratio of hydrogen to silicon tetrachloride introduced into the rector 60 may vary depending on the reaction conditions. Use of a stoichiometric excess of hydrogen typically results in increased conversion to trichlorosilane. In various embodiments, the molar ratio of hydrogen to silicon tetrachloride is at least about 1:1, at least about 2:1 or even at least about 3:1 (e.g., from about 1:1 to about 5:1 or from about 1:1 to about 3:1).

Generally, at least about 20% of silicon tetrachloride is converted to trichlorosilane in the hydrogenation reactor 60 with conversions of at least about 30%, at least about 40% or even at least about 50% being possible (e.g., from about 20% to about 60% conversion). The resulting hydrogenated gas 63 contains trichlorosilane, unreacted silicon tetrachloride, unreacted hydrogen and hydrogen chloride. Depending on the amount of excess hydrogen 22 added to the reactor, the amount of trichlorosilane in the hydrogenated gas 63 may be at least about 5 vol % and, in other embodiments, at least about 10 vol %, at least about 25 vol %, or at least about 40 vol % (e.g., from about 5 vol % to about 50 vol %, from about 5 vol % to about 20 vol % or from about 5 vol % to about 10 vol %). Likewise, the amount of hydrogen chloride in the hydrogenated gas may be at least about 5 vol % and, in other embodiments, at least about 10 vol %, at least about 25 vol %, or at least about 40 vol % (e.g., from about 5 vol % to about 50 vol %, from about 5 vol % to about 20 vol % or from about 5 vol % to about 10 vol %). The amount of unreacted silicon tetrachloride may be at least about 10 vol %, at least about 20 vol %, at least about 30 vol % or at least about 40 vol % of the hydrogenated gas stream 63 (e.g., from about 10 vol % to about 50 vol %, from about 10 vol % to about 30 vol % or from about 15 vol % to about 25 vol %). The remainder of the hydrogenated gas 63 is typically hydrogen. For instance, the hydrogenated gas 63 may include at least about 40 vol % hydrogen or, as in other embodiments, at least about 50 vol %, at least about 60 vol %, at least about 70 vol % or even at least about 80 vol % hydrogen (e.g., from about 40 vol % to about 90 vol %, from about 50 vol % to about 80 vol % or from about 60 vol % to about 80 vol %). The hydrogenated gas 63 is introduced into the separation system 4 to separate the components thereof.

Silane 29 (or dichlorosilane as described above) produced from the disproportionation system 76 is introduced into the fluidized bed reactor 30 in which it fluidizes growing silicon seed particles to produce polycrystalline silicon which may be withdrawn from the reactor 30 as polycrystalline silicon product 27. Polycrystalline silicon 27 is produced from silane 29 with formation of hydrogen by-product according to the following pyrolysis reaction,

$$SiH_4 \rightarrow Si + 2H_2 \qquad (8).$$

Polycrystalline silicon 27 may be withdrawn from the reactor 30 intermittently or continually through a product withdrawal tube and an effluent gas 39 that includes hydrogen, unreacted silane (or dichlorosilane) and silicon dust may be withdrawn from the upper portion of the reactor 30. The effluent gas 39 may contain up to about 15 wt % silicon dust and up to about 5 wt % unreacted silane. Dust may be removed from the effluent gas by use of a particulate separator (not shown). Suitable particulate separators include, for example, bag filters, cyclonic separators and liquid scrubbers. Silicon dust may be recycled for use in the reactor 30 as disclosed in U.S. Pat. Pub. No. 2009/0324819, which is incorporated herein by reference for all relevant and consistent purposes. Alternatively, the silicon dust may be disposed of or even collected as a product when it contains low levels of metal impurities (e.g., when the particulate separator system includes ceramic, quartz or silicon carbide surfaces). The dust-depleted effluent gas may be compressed (e.g., from about 5 bar to about 25 bar) and/or purified and a portion 41 of the effluent gas 39 may be reintroduced into the reactor 30 as a carrier for silane 29. The remainder 43 of the effluent gas 43 may be introduced into the hydrogenation reactor 60. Dust-depleted effluent gas 39 may be purified by any of the methods known by those of skill in the art (e.g., adsorption). In several embodiments of the present disclosure, at least a portion of the effluent gas is introduced into the separation system 4. An amount of hydrogen (e.g., an amount of hydrogen 22 withdrawn from the purification system) may be returned to the fluidized bed reactor 30 as a carrier gas for silane 29.

The fluidized bed reactor 30 may be operated at an overhead pressure of from about 3 bar to about 15 bar and the incoming gases (silane 29 and recycled effluent gas 41) may be pre-heated to a temperature of at least about 200° C. (e.g., from about 200° C. to about 500° C. of from about 200° C. to about 350° C.). The reactor 30 may be maintained at a temperature of at least about 600° C. (e.g., 600° C. to about 900° C. or from about 600° C. to about 750° C.) by use of external heating means such as induction heating or use of resistive heating elements. The gas velocity through the fluidized bed reactor 30 may be generally maintained at a velocity of from about 1 to about 8 times the minimum fluidization velocity necessary to fluidize the particles within the fluidized bed. The mean diameter of the particulate polycrystalline silicon that is withdrawn from the reactor 30 may be at least about 600 μm (e.g., from about 600 μm to about 1500 μm or from about 800 μm to about 1200 μm). The mean diameter of the silicon seed particles introduced into the reactor may be less than about 600 μm (e.g., from about 100 μm to about 600 μm). Quench gases may be introduced into the reactor 30 (e.g., at a freeboard region of the reactor) to reduce the temperature of the effluent gas 39 before being discharged from the reactor to suppress formation of silicon dust. The fluidized bed reactor may include an outer shell in which an inert gas is maintained at a pressure above the pressure of the process gases (e.g., a differential pressure within the range of about 0.005 bar to about 0.2 bar) to ensure process gases do not flow through cracks and holes within the reaction chamber. Silane may be directed to the core region of the reactor and carrier gas (e.g., hydrogen) may be directed to the peripheral portion of the reactor near the reactor walls to reduce the deposition of silicon on the walls of the reactor as disclosed in U.S. Pat. Pub. No. 2009/0324479 and U.S. Pat. Pub. No. 2011/0158888, both of which are incorporated herein by reference for all relevant and consistent purposes. In some embodiments of the present disclosure, the conversion of silane in the fluidized bed reactor may be at least about 70%, at least about 80%, at least about 90% or even at least about 95% (e.g., from about 70% to about 99% or from about 90% to about 99%).

Hydrogen and/or chlorine (e.g., hydrogen chloride or silicon tetrachloride) may be introduced into the system shown in FIG. 1 in one or more make-up streams to replace hydrogen and chlorine that exits the system as an impurity in any of the product streams or impurity purge streams (not shown). These make-up streams may supply hydrogen and/or chlorine to the system (or other compounds which contain hydrogen and/or chlorine atoms) at any number of process points including, for example, addition of hydrogen to the hydrogenation reactor 60 or as a carrier gas to the fluidized bed reactor 30 or addition of hydrogen chloride to the chlorination reactor 7. In some embodiments of the present disclosure, the ratio of hydrogen chloride added as a make-up to the amount of hydrogen chloride circulating in the substantially closed-loop system is less than about 1:10, less than about 1:20, less than about 1:50 or even less than about 1:100 (e.g., from about 1:250 to about 1:10 or from about 1:100 to about 1:20). In addition or alternatively, the ratio of hydrogen (i.e., $H_2$ gas) added as a make-up to the amount of hydrogen circulating in the substantially closed-loop system (i.e., the amount of hydrogen gas, $H_2$ and not hydrogen included within other molecules) is less than about 1:10, less than about 1:20, less than about 1:50 or even less than about 1:100 (e.g., from about 1:250 to about 1:10 or from about 1:100 to about 1:20).

Hydrogen and/or chlorine make-up may also be characterized by the molar ratio of these gases added as a make-up to polycrystalline product that is produced. In several embodiments of the present disclosure, the molar ratio of chlorine (i.e., based on the moles of chlorine atoms (Cl)) added as a make-up, including chlorine gas itself (if any) and chlorine atoms that form part of chlorine-containing compounds (e.g., HCl, $SiHCl_3$ and/or $SiCl_4$) to polycrystalline silicon product that is produced (not including silicon dust) is less than about 2:1 and, as in other embodiments, less than about 1:1, less than about 1:1.2, less than about 1:1.5, less than about 1:2 or less than about 1:2.5 (e.g., from about 2:1 to 1:5 or from about 1:1 to about 1:5). The molar ratio of hydrogen (i.e., based on the moles of hydrogen atoms (H)) added as a make-up, including hydrogen gas itself (if any) and hydrogen atoms that form part of other hydrogen-containing compounds (e.g., HCl, $SiHCl_3$, $SiCl_4$ and/or $SiH_4$ but excluding hydrogen included within water that is used to separate hydrogen from hydrogen chloride in a bubbler-type system) to polycrystalline silicon product that is produced may be less than about 1:1 and, as in other embodiments, less than about 1:2, less than about 1:3, less than about 1:5, less than about 1:10 (e.g., from about 1:1 to 1:20 or from about 1:2 to about 1:10). In some embodiments, no hydrogen is added to the process as a make-up stream. Additionally no trichlorosilane, silicon tetrachloride or silane is typically added to the system; rather, these compounds are produced and consumed within the system itself It is to be noted that, unless otherwise stated, the various concentrations, concentration ranges, percent inclusions, ratios, operating parameters (e.g., temperatures, pressures, conversion) and the like recited herein, are provided for illustration purposes only and therefore should not be viewed in a limiting sense. It is to be additionally noted that all various combinations and permutations of compositions, concentrations, percent inclusions ratios, components, operating parameters and the like are intended to be within the scope of and supported by the present disclosure.

Closed-Loop Systems for Producing Polycrystalline Silicon

The processes described above may be incorporated into a substantially closed-loop system for producing polycrystalline silicon. Such systems above may be substantially closed-loop with respect to trichlorosilane, silicon tetrachloride, silane, hydrogen chloride and/or hydrogen. In several embodiments of the present disclosure and as shown in FIG. 1, the system includes a chlorination reactor 7 in which hydrogen chloride is contacted with silicon to produce trichlorosilane and silicon tetrachloride. The system includes a disproportionation system 76 in which trichlorosilane is converted to silane or dichlorosilane and a fluidized bed reactor 30 in which silane or dichlorosilane is decomposed to produce polycrystalline silicon 27. The system includes a hydrogenation reactor 60 in which silicon tetrachloride and hydrogen are introduced to produce trichlorosilane. The system may include a stripper column (not shown) to remove light end impurities prior to introduction of silicon tetrachloride and trichlorosilane 26 into the disproportionation system 76.

Referring now to FIG. 2, the disproportionation system 76 includes a first distillation column 65 for separating silicon tetrachloride into a bottoms fraction 57 and to separate dichlorosilane and trichlorosilane into an overhead fraction 69. A second distillation column 67 separates trichlorosilane into a bottoms fraction 5 and dichlorosilane into an overhead fraction 15. A first disproportionation reactor 50 produces a first disproportionation reactor product gas 9 that contains dichlorosilane and silicon tetrachloride. A second disproportionation reactor 52 produces a second disproportionation reactor product gas 98 that contains silane and trichlorosilane. A third distillation column 56 separates silane into an overhead fraction 29 and trichlorosilane into a bottoms fraction 94.

The system may include various conveying apparatus for transferring various components within the system. The system may include a conveying apparatus to convey trichlorosilane from the hydrogenation reactor 60 to the disproportionation system 76. A conveying apparatus conveys silane or dichlorosilane from the disproportionation system 76 to the fluidized bed reactor 30 and a conveying apparatus conveys trichlorosilane from the chlorination reactor 7 to the disproportionation system 76. The system may also include a conveying apparatus for conveying silicon tetrachloride from the disproportionation system 76 to the hydrogenation reactor 60.

The system may include a separation system 4 to separate hydrogen, hydrogen chloride, silicon tetrachloride and trichlorosilane. A conveying apparatus conveys trichlorosilane and silicon tetrachloride from the separation system 4 to the disproportionation system 76 and a conveying apparatus conveys hydrogen chloride from the separation system 4 to the chlorination reactor 7. A conveying apparatus conveys hydrogen from the separation system 4 to the hydrogenation reactor 60 and a conveying apparatus transfers hydrogenated gas from the hydrogenation reactor 60 to the separation system 4. Another conveying apparatus conveys chlorinated gas from the chlorination reactor 7 to the separation system 4.

Referring now to FIG. 3, the separation system 4 may include a chlorosilane separator 40 for separating trichlorosilane and silicon tetrachloride 26 from hydrogen and hydrogen chloride 42 and a hydrogen separator 47 for separating hydrogen 22 from hydrogen chloride 6. As discussed above, the chlorosilane separator may be a vapor-liquid separator (e.g., knock-out drum) and the hydrogen separator may be a vapor-liquid separator or a bubbler.

In this regard, suitable conveying apparatus for use in the systems of FIGS. 1-3 are conventional and well known in the art. Suitable conveying apparatus for the transfer of gases include, for example, recirculation fans, compressors or blowers. Suitable conveying apparatus for transfer of liquids include, for example, pumps and compressors and suitable conveying apparatus for transfer of solids include, for example, drag, screw, belt and pneumatic conveyors. In this regard, it should be understood that use of the phrase "conveying apparatus" herein is not meant to imply direct transfer from one unit of the system to another but rather only that the material is transferred from one unit to another by any number of indirect transfer parts and/or mechanisms. For instance, material from one unit may be conveyed to further processing units (e.g., purification or storage units used to provide a buffer between continuous or batch-wise processes) and then conveyed to the second unit. In this example, each unit of conveyance including the intermediate processing equipment itself may be considered to be the "conveying apparatus" and the phrase "conveying apparatus" should not be considered in a limiting sense.

All equipment used in the systems for producing polycrystalline silicon may be resistant to corrosion in an environment that includes exposure to compounds used and produced within the system. Suitable materials of construction are conventional and well-known in the field of this disclosure and include, for example, carbon steel, stainless steel, MONEL alloys, INCONEL alloys, HASTELLOY alloys, nickel and non-metallic materials such as quartz (i.e., glass), and fluorinated polymers such as TEFLON, KEL-F, VITON, KALREZ and AFLAS.

As shown in FIG. 1, the systems and processes described herein are substantially closed loop with respect to trichlorosilane, silicon tetrachloride, silane, hydrogen chloride and/or hydrogen in that the system does not include trichlorosilane, silicon tetrachloride, silane, hydrogen, hydrogen chloride or trichlorosilane in the inlet stream 3 and these compounds are not removed from the system in the outlet stream 27. In this regard, it should be understood that amounts of trichlorosilane, silicon tetrachloride, silane, hydrogen chloride and/or hydrogen may be removed from the system in a purge stream and may be fed into the system or process as in a make-up stream. Make-up of these compounds may be achieved by addition of the compounds to any process stream as may be determined by those of skill in the art.

It should be understood that the processes and systems described above may include more than one of any of the recited units (e.g., reactors, columns and/or separation units) and that multiple units may be operated in series and/or in parallel without departing from the scope of the present disclosure. Further in this regard, it should be understood that the process and systems that are described are exemplary and the processes and systems may include additional units which carry out additional functions without limitation.

When introducing elements of the present disclosure or the various embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A substantially closed-loop process for producing polycrystalline silicon, the process comprising:
    introducing trichlorosilane into a disproportionation system to produce silicon tetrachloride and silane, the disproportionation system comprising a first distillation column, a second distillation column, a third distillation column, a first disproportionation reactor and a second disproportionation reactor, wherein:
        trichlorosilane and silicon tetrachloride produced from the chlorination reactor and dichlorosilane produced from the first disproportionation reactor are introduced into the first distillation column to separate silicon tetrachloride into a bottoms fraction and to separate dichlorosilane and trichlorosilane into an overhead fraction;
        the overhead fraction produced from the first distillation column is introduced into the second distillation column to separate trichlorosilane into a bottoms fraction and dichlorosilane into an overhead fraction;
        the bottoms fraction produced from the second distillation column is introduced into the first disproportionation reactor to produce a first disproportionation reactor product gas comprising dichlorosilane and silicon tetrachloride, the first disproportionation reactor product gas being introduced into the first distillation column;
        the overhead fraction produced from the second distillation column is introduced into the second disproportionation reactor to produce a second disproportionation reactor product gas comprising silane and trichlorosilane;
        the second disproportionation reactor product gas is introduced into the third distillation column to separate silane into an overhead fraction and trichlorosilane into a bottoms fraction; and
        the bottoms fraction produced from the third distillation column is introduced into the second distillation column;
    introducing the overhead fraction produced from the disproportionation system into a fluidized bed reactor to produce polycrystalline silicon and an effluent gas comprising hydrogen and unreacted silane, the overhead fraction comprising silane;
    introducing an amount of silicon tetrachloride produced from the disproportionation system and an amount of hydrogen from the effluent gas into a hydrogenation reactor to produce trichlorosilane and hydrogen chloride;
    introducing an amount of hydrogen chloride produced from the hydrogenation reactor and silicon into a chlorination reactor to produce a chlorinated gas comprising trichlorosilane and silicon tetrachloride; and
    introducing trichlorosilane produced from the chlorination reactor to the disproportionation system to produce silicon tetrachloride and silane.

2. The process as set forth in claim 1 wherein the bottoms fraction produced from the first distillation column is introduced into the hydrogenation reactor to produce trichlorosilane and hydrogen chloride.

3. The process as set forth in claim 1 wherein silicon tetrachloride and hydrogen are introduced into the hydrogenation reactor to produce a hydrogenated gas comprising trichlorosilane, hydrogen chloride, unreacted hydrogen and unreacted silicon tetrachloride, the hydrogenated gas being introduced into a separation system to separate trichlorosilane and unreacted silicon tetrachloride from hydrogen and unreacted hydrogen chloride, the trichlorosilane and unreacted silicon tetrachloride being introduced into the disproportionation system.

4. The process as set forth in claim 3 wherein the separation system comprises:
    a chlorosilane separator for separating trichlorosilane and silicon tetrachloride from hydrogen and hydrogen chloride; and
    a hydrogen separator for separating hydrogen from hydrogen chloride, the separated hydrogen chloride being introduced into the chlorination reactor, the separated hydrogen being introduced into at least one of the hydrogenation reactor and the fluidized bed reactor.

5. The process as set forth in claim 3 wherein the chlorosilane separator is a vapor-liquid separator.

6. The process as set forth in claim 3 wherein the hydrogen separator is a vapor-liquid separator or a bubbler.

7. The process as set forth in claim 3 wherein the chlorinated gas comprises trichlorosilane, silicon tetrachloride, hydrogen and unreacted hydrogen chloride and wherein the chlorinated gas is introduced into the separation system.

8. The process as set forth in claim 1 wherein the chlorinated gas is introduced into a stripper column to remove light end impurities prior to introduction into the disproportionation system.

9. The process as set forth in claim 1 wherein the molar ratio of hydrogen chloride added as a make-up to the amount of hydrogen chloride circulating within the substantially closed-loop process is less than about 1:10.

10. The process as set forth in claim 1 wherein the molar ratio of hydrogen gas added as a make-up to the amount of hydrogen circulating in the substantially closed-loop process is less than about 1:10.

11. The process as set forth in claim 1 comprising adding chlorine as a make-up, wherein the molar ratio of chlorine added as a make-up to polycrystalline silicon product that is produced is less than about 2.1.

12. The process as set forth in claim 1 wherein the molar ratio of hydrogen added as a make-up to polycrystalline silicon product that is produced is less than about 1.1.

* * * * *